United States Patent
Shinohara et al.

(10) Patent No.: US 10,109,302 B1
(45) Date of Patent: Oct. 23, 2018

(54) MAGNETIC RECORDING HEAD WITH SPIN TORQUE OSCILLATOR, HEAD GIMBAL ASSEMBLY AND MAGNETIC RECORDING APPARATUS

(71) Applicant: TDK Corporation, Tokyo (JP)

(72) Inventors: Tetsuhito Shinohara, Tokyo (JP); Tetsuya Roppongi, Tokyo (JP); Naomichi Degawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/652,684

(22) Filed: Jul. 18, 2017

(51) Int. Cl.
| | |
|---|---|
| *G11B 5/127* | (2006.01) |
| *G11B 5/10* | (2006.01) |
| *G11B 5/02* | (2006.01) |
| *G11B 5/31* | (2006.01) |
| *G11B 5/147* | (2006.01) |
| *G11B 5/004* | (2006.01) |
| *G11B 5/00* | (2006.01) |

(52) U.S. Cl.
CPC ............... *G11B 5/10* (2013.01); *G11B 5/02* (2013.01); *G11B 5/1278* (2013.01); *G11B 5/315* (2013.01); *G11B 5/3133* (2013.01); *G11B 5/3146* (2013.01); *G11B 5/004* (2013.01); *G11B 5/147* (2013.01); *G11B 2005/0002* (2013.01)

(58) Field of Classification Search
CPC ... G11B 5/1278; G11B 5/3133; G11B 5/3146; G11B 5/315
USPC ........................................................ 360/125.3
See application file for complete search history.

(56) References Cited

U.S. PATENT DOCUMENTS

| | | | |
|---|---|---|---|
| 8,995,088 B1 * | 3/2015 | Boone | G11B 5/3146 360/125.32 |
| 9,047,887 B2 | 6/2015 | Funayama | |
| 9,349,389 B2 * | 5/2016 | Takagishi | G11B 5/11 |
| 9,741,373 B1 * | 8/2017 | Shinohara | G11B 5/3912 |
| 9,747,932 B1 * | 8/2017 | Taguchi | G11B 5/1278 |
| 2012/0147502 A1 * | 6/2012 | Udo | G11B 5/1278 360/125.12 |
| 2013/0028058 A1 * | 1/2013 | Yasui | G11B 5/1278 369/13.14 |
| 2013/0316088 A1 * | 11/2013 | Fujita | G11B 5/84 427/526 |
| 2014/0313616 A1 * | 10/2014 | Kusukawa | G11B 5/187 360/125.03 |

(Continued)

OTHER PUBLICATIONS

U.S. Appl. No. 15/138,405, filed Apr. 26, 2016, Shinohara et al.

*Primary Examiner* — Jefferson Evans
(74) *Attorney, Agent, or Firm* — Posz Law Group, PLC

(57) ABSTRACT

A magnetic recording head is provided with a main magnetic pole that generates a recording magnetic field to be applied to a magnetic recording medium from an end surface which makes a portion of an air bearing surface, a trailing shield that is placed by interposing a write gap at a trailing side of the main magnetic pole, a spin torque oscillator that is placed within the write gap to be between the main magnetic pole and the trailing shield, and two side shields that are placed at both sides of the main magnetic pole in the cross track direction, and when viewed from the air bearing surface side, at least a portion of the trailing-side end surfaces of the side shields are offset toward a leading-side of the main magnetic pole from the leading-side end surface of the spin torque oscillator.

9 Claims, 11 Drawing Sheets

(56) References Cited

U.S. PATENT DOCUMENTS

2015/0310881 A1* 10/2015 Koui ................... G11B 5/314
                                                    360/235.4
2016/0314809 A1* 10/2016 Taguchi ............... G11B 5/314
2017/0047084 A1*  2/2017 Funayama ............ G11B 5/112

* cited by examiner

MAGNETIC RECORDING HEAD WITH SPIN TORQUE OSCILLATOR, HEAD GIMBAL ASSEMBLY AND MAGNETIC RECORDING APPARATUS

FIELD OF THE INVENTION

The present invention relates to a magnetic recording head, a head gimbal assembly and a magnetic recording apparatus.

BACKGROUND OF THE INVENTION

In a field of magnetic recording using a head and a medium, further improvement of performance of a magnetic recording medium and a magnetic recording head is in demand in association with the high recording density of a magnetic disk device.

A magnetic recording medium is a discontinuous medium where magnetic grains aggregate, and where each magnetic grain has a single magnetic domain structure. In such a magnetic recording medium, one recording bit is configured by a plurality of magnetic grains. Consequently, in order to enhance the recording density, by making the size of the magnetic grains smaller, the unevenness of the boundaries of adjacent recording bits has to be reduced. However, if the size of the magnetic nanoparticles is reduced, there is the problem that the thermal stability of magnetization of the magnetic grains is decreased.

As a countermeasure against this problem, although an increase in magnetic anisotropic energy Ku of the magnetic grains can be considered, the increase of Ku brings an increase in an anisotropic field (coercive force) of a magnetic recording medium. In the meantime, the upper limit of the recording magnetic field intensity by a magnetic recording head is substantially determined by the saturation magnetic flux density of a soft magnetic material that configures a magnetic core within a head. Consequently, if an anisotropic field of the magnetic recording medium exceeds the tolerance value determined from the upper limit of the recording magnetic field intensity, it is impossible to record into the magnetic recording medium.

At present, as one method for resolution of such thermal stability issue, a magnetic recording medium made of a magnetic material with great Ku is used. In the meantime, energy assisted recording that reduces effective recording magnetic field intensity by supplementally providing energy to the medium at the time of recording is proposed. The recording method where a microwave magnetic field is used as the supplemental energy source is referred to as microwave assisted magnetic recording (MAMR), for which research and development for practical use are in progress.

In microwave assisted magnetic recording, because a microwave magnetic field in a medium in-plane direction of a frequency according to an effective magnetic field (Heff) to be applied to magnetization of a recording layer in a magnetic recording medium is applied, precession movement of the magnetization in the recording layer is excited, and recording capability by a magnetic recording head is assisted.

As one example of a magnetic recording head where the microwave assisted magnetic recording method is adopted, as shown in FIG. 15, a magnetic recording head that is provided with a main magnetic pole 6' that generates a recording magnetic field for applying to a magnetic recording medium, a wraparound shield which has a trailing shield 81' and side shields 82' and 83', and a spin torque oscillator (STO) 10' which has a multilayer structure of a magnetic thin film placed in a write gap between the main magnetic pole 6' and the side shields 82' and 83', is proposed (for example, U.S. Pat. No. 9,047,887). The spin torque oscillator 10' is an element where its magnetization fluctuates while precessing in response to the spin transfer torque, and its recording performance can be improved by having a mutual influence on the recording magnetic field (strengthening or weakening the recording magnetic field) by the magnetic field that is generated from the spin torque oscillator 10'. For example, the spin torque oscillator 10' can generate a microwave magnetic field in an in-plane direction due to its oscillation. The precession movement of the magnetization in the recording layer is induced by superimposing the microwave magnetic field and the recording magnetic field on the magnetic recording medium, and perpendicular magnetization in the recording layer is reversed.

In such a magnetic recording head, in order that the magnetic field that is sufficiently generated from the spin torque oscillator 10' has a mutual influence on the recording magnetic field, it is necessary to increase the spin transfer torque that acts on the spin torque oscillator 10' and to increase variations of magnetization. However, in the magnetic recording head shown in FIG. 15, there is the problem that the oscillation of the spin torque oscillator 10' is inhibited due to the magnetic coupling between the spin torque oscillator 10' and the side shields 82' and 83'. Further, since the magnetization of the side shields 82' and 83' fluctuates due to the magnetic coupling between the spin torque oscillator 10' and the side shields 82' and 83', there is also concern that deterioration of writing (writing into an adjacent track) may occur (ATE: adjacent track erasure; WATE: wide area track erasure).

SUMMARY OF THE INVENTION

The objective of the present invention is to provide a novel magnetic recording head, head gimbal assembly and magnetic recording apparatus that can improve the oscillation of a spin torque oscillator.

In order to accomplish the above objective, the present invention provides a magnetic recording head that is provided with a main magnetic pole that generates a recording magnetic field to be applied to a magnetic recording medium from an end surface that forms a portion of an air bearing surface (hereafter, referred to as ABS) facing the magnetic recording medium, a trailing shield that is placed by interposing a write gap at a trailing side of the main magnetic pole, a spin torque oscillator that is placed within the write gap to be between the main magnetic pole and the trailing shield and that generates a microwave magnetic field to be superimposed on the magnetic recording medium with the recording magnetic field, and two side shields that are placed at both sides of the main magnetic pole in a cross track direction, wherein when viewed from the ABS side, at least a portion of the trailing-side end surfaces of the two side shields are positioned closer to the leading side than the leading-side end surface of the spin torque oscillator.

In the magnetic recording head, among the trailing-side end surfaces of the side shields, the portion that is included within a range of a predetermined length along the cross track direction from the cross track-direction end part of the spin torque oscillator may be positioned closer to the leading side than the leading-side end surface of the spin torque oscillator, and the range of the predetermined length can be set within a range of 15 nm to 100 nm.

among the trailing-side end surfaces of the side shields, the portion that is positioned in the cross track direction outside of the predetermined length along the cross track direction from the cross track-direction end part of the spin torque oscillator can be positioned closer to the trailing side than the leading-side end surface of the spin torque oscillator, and on the ABS, all sides configuring each trailing-side end surface of the two side shields can be positioned closer to the leading side than the sides configuring the leading-side end surface of the spin torque oscillator.

On a cut plane surface where the magnetic recording head is cut along a direction that is orthogonal to the ABS and parallel to the down track direction, it is preferable that, among the trailing-side end surfaces of the main magnetic pole, at least a portion at a back side in the height direction from the ABS is positioned closer to the leading side than an imaginary plane obtained by extending leading-side end surface of the spin torque oscillator rearward in the height direction.

Further, the present invention provides a magnetic recording head that is provided with: a main magnetic pole that generates a recording magnetic field to be applied to a magnetic recording medium from an end surface forming a part of an air bearing surface (hereafter, referred to as ABS) facing the magnetic recording medium, a trailing shield that is placed by interposing a write gap at a trailing side of the main magnetic pole, a spin torque oscillator that is placed within the write gap to be between the main magnetic pole and the trailing shield and that generates a microwave magnetic field to be superimposed on the magnetic recording medium with the recording magnetic field, and two side shields that are placed at both sides of the main magnetic pole in a cross track direction, wherein on a cut plane surface where the magnetic recording head is cut along a direction that is orthogonal to the ABS and parallel to the down track direction, among the trailing-side end surfaces of the main magnetic pole, at least a portion at the back side in the height direction from the ABS is positioned closer to the leading side than an imaginary plane obtained by extending the leading-side end surface of the spin torque oscillator rearward in the height direction.

In addition, the present invention provides a head gimbal assembly that is provided with: the magnetic recording head according, and a suspension that supports the magnetic recording head.

In addition, the present invention provides a magnetic recording apparatus that is provided with: a magnetic recording medium, the magnetic recording head, and a positioning device that supports the magnetic recording head, and, that positions the magnetic recording head relative to the magnetic recording medium.

According to the present invention, novel magnetic recording head, head gimbal assembly and magnetic recording apparatus that can improve oscillation of a spin torque oscillator can be provided.

DETAILED DESCRIPTION OF THE INVENTION

Prior to explaining the embodiments of the present invention, terms that are used herein are defined. In a laminate structure or an element structure formed on an element formation surface of a slider substrate in a magnetic recording head relating to the present embodiment, as viewed from a layer or an element to be a reference, the substrate side is referred to as "downward" and its opposite side is referred to as "upward". Further, as viewed from the layer or the element to be a reference, the ABS side is referred to as "forward" and its opposite side is referred to as "backward" or "rearward". In addition, in the magnetic recording head relating to the present embodiment, "X-, Y- and Z-axis directions" are defined in some drawings as needed. Here, the Z-axis direction is "vertical direction" as mentioned above, and +Z side is equivalent to a trailing side, and −Z side is equivalent to a leading side. Further, the Y-axis direction is a track width direction, and the X-axis direction is a height direction.

[Magnetic Recording Apparatus]

Figure 1:
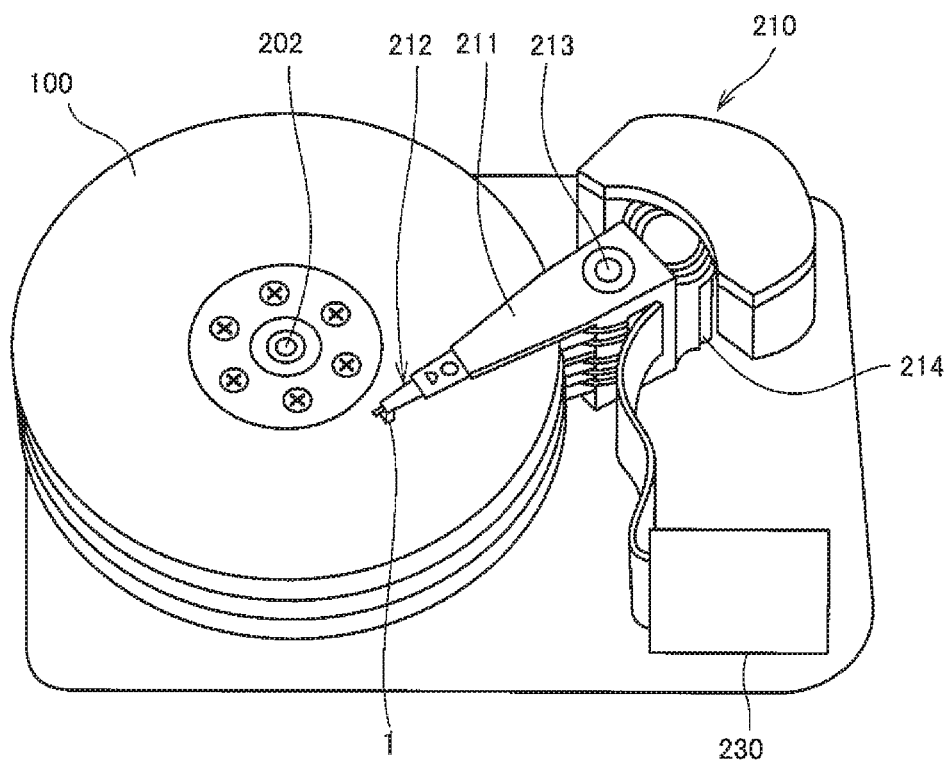
FIG. 1 is a perspective view schematically showing a magnetic recording apparatus in one embodiment of the present invention.
Figure 2:
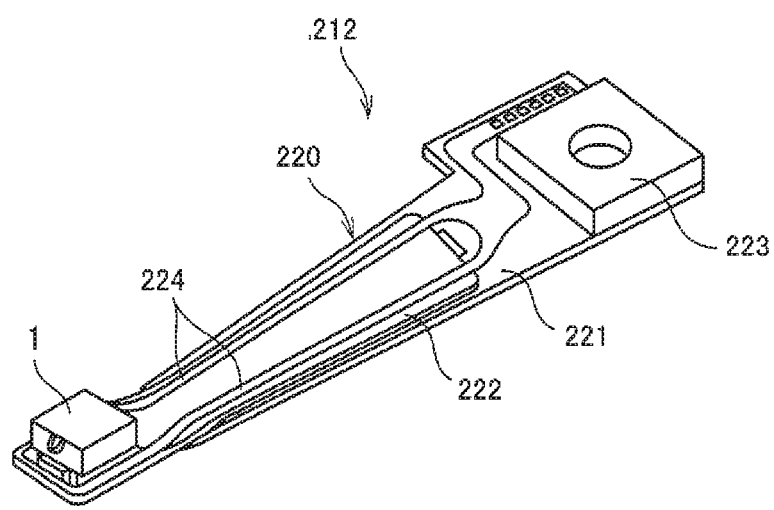
FIG. 2 is a perspective view schematically showing a head gimbal assembly (HGA) in one embodiment of the present invention.
Figure 3:
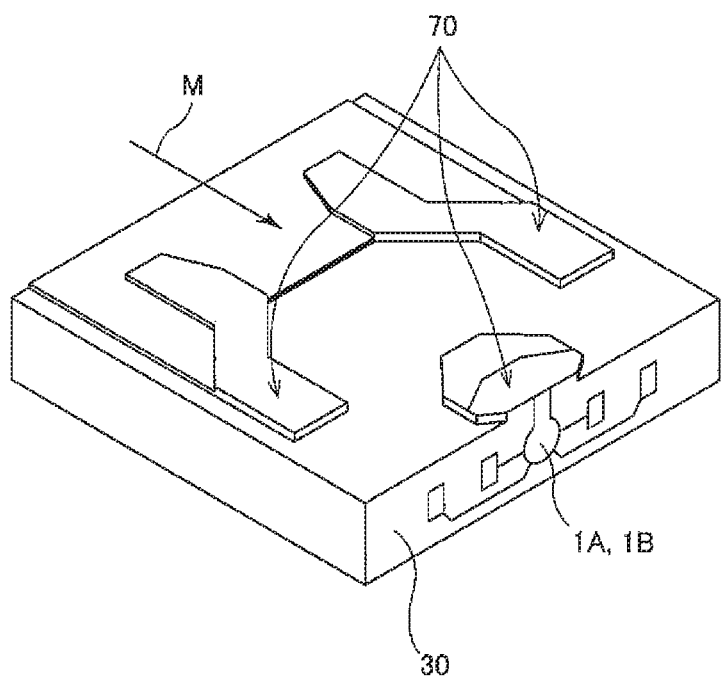
FIG. 3 is a perspective view showing an overall configuration of a magnetic recording head in one embodiment of the present invention in a pattern manner.

FIG. 1 is a perspective view schematically showing a magnetic recording apparatus in one embodiment; FIG. 2 is a perspective view schematically showing a head gimbal assembly (HGA) provided with the magnetic recording head in one embodiment; and FIG. 3 is a perspective view showing an overall configuration of a magnetic recording head in one embodiment in a pattern manner.

As shown in FIG. 1, a magnetic recording apparatus in the present embodiment is provided with a plurality of magnetic disks 100 that rotate around a rotary shaft of a spindle motor 202; an assembly carriage device 210 where a plurality of drive arms 211 are placed; head gimbal assemblies (HGA) 212 that are mounted at a front end portion of each drive arm 211, and that has a magnetic recording head 1, respectively; and a control circuit 230 that controls writing and reading operations and the like into/from the magnetic recording head 1.

In the present embodiment, the magnetic disk 100 as a magnetic recording medium is for perpendicular magnetic recording, and for example, has a configuration where a soft magnetic under layer, an intermediate layer and a magnetic recording layer (perpendicular magnetization layer) are sequentially laminated onto a disk substrate.

The assembly carriage device 210 is a device for positioning the magnetic recording head 1 on a track where recording bits of the magnetic disks 100 are aligned. In the assembly carriage device 210, the drive arms 211 are stacked in a direction along a pivot bearing shaft 213, and are configured to enable angle swinging centering on the pivot bearing shaft 213 by a voice coil motor (VCM) 214.

Furthermore, the structure of the magnetic recording apparatus in the present embodiment is not limited to the structure above, but the magnetic disk 100, the drive arm 211, the HGA 212 and the magnetic recording head 1 may be singular.

For the head gimbal assembly 212 shown in FIG. 2, a suspension 220 has a load beam 221, a flexure 22 that is attached to the load beam 221 and that has flexibility, and a base plate 223 that is placed at a base part of the load beam 221. Further, wiring members 224 including a lead conductor and connection pads that are electrically connected to its both ends are placed on the flexure 222. A magnetic recording head slider 30 (see FIG. 3) that is provided with the magnetic recording head 1 of the present embodiment is attached to the flexure 222, at the front end portion of the suspension 220, to face the surface of each magnetic disk 100 at predetermined intervals (flying height).

In addition, one end of the wiring member 224 is electrically connected to a terminal electrode of the magnetic recording head 1 in the present embodiment. Furthermore, the structure of the suspension 220 in the present embodiment shall not be limited to the structure above.

As shown in FIG. 3, the magnetic recording head slider 30 has an air bearing surface (ABS) 70 that directly involves a flying characteristic, and is provided with the magnetic recording head 1 on a side end at a traveling direction M (the same direction as an air current) side of the magnetic disk 100 (a side end backward in the traveling direction M of the magnetic disk 100). The magnetic recording head 1 is provided with a recording head 1B and a reproducing head 1A.

[Magnetic Recording Head]

Figure 4:
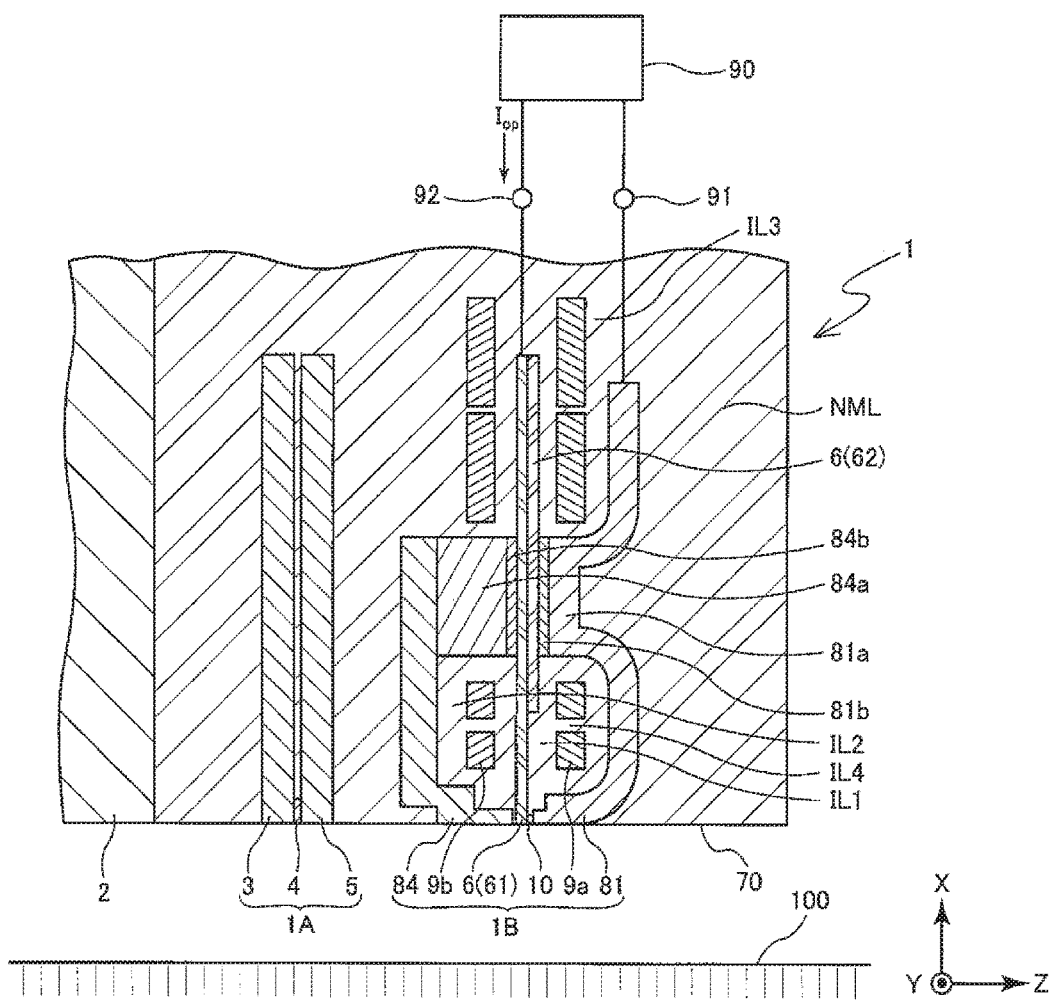
FIG. 4 is a cross-sectional view (XZ plane) schematically showing a structure of a main part of the magnetic recording head relating to one embodiment of the present invention.

The magnetic recording head relating to the present embodiment is explained hereafter, with reference to the drawings. FIG. 4 is a cross-sectional view (XZ cross-section) along a direction that crosses the ABS, which is an air bearing surface, in the magnetic recording head relating to the present embodiment.

As shown in FIG. 4, the magnetic recording head 1 relating to the present embodiment has a slider substrate 2, and the reproducing head 1A and the recording head 1B laminated on the element formation surface of the slider substrate 2. Further, the magnetic recording head 1 has the ABS 70, which is an air bearing surface facing the magnetic disk 100.

The reproducing head 1A has an MR element 4, for detecting a signal magnetic field from the magnetic disk 100, and a lower shield layer 3 and an upper shield layer 5 made from a magnetic material formed on the element formation surface of the slider substrate 2.

The lower shield layer 3 and the upper shield layer 5 are placed to mainly prevent the MR element 4 from receiving an external magnetic field, which will become noise. The lower shield layer 3 and the upper shield layer 5 are magnetic layers made from a magnetic material formed by a frame plating method, a sputtering method, or the like. The lower shield layer 3 and the upper shield layer 5 are configured with, for example, NiFe (permalloy), FeSiAl (sendust), CoFeNi, CoFe, FeN, FeZrN or CoZrTaCr, or a soft magnetic material, such as a multilayer film of these materials. The thickness of the lower shield layer 3 and the upper shield layer 5 is, for example, approximately 0.1 μm to 3 μm, respectively.

The MR element 4 is a magnetic sensor that receives a signal magnetic field by using the MR effect, and it can be any of, for example, a Current In Plane-Giant Magneto-Resistive (CIP-GMR) multilayer body utilizing an in-plane current-passage type giant magnetoresistive effect, a Current Perpendicular to Plane-Giant Magneto-Resistive (CPP-GMR) multilayer body utilizing a perpendicular current-passage type giant magnetoresistive effect, and a Tunneling Magneto-Resistive (TMR) multilayer body utilizing a tunnel magnetoresistive effect.

The MR element 4 utilizing these MR effects can receive a signal magnetic field from the magnetic disk 100 at high sensitivity. Furthermore, if the MR element 4 is the CPP-GMR multilayer body or the TMR multilayer body, the lower-side shield layer 3 and the upper-side shield layer 5 can fulfill a role as an electrode, respectively. In the meantime, if the MR element 4 is the CIP-GMR multilayer body, an insulating layer is placed between the MR element 4 and the lower shield layer 3 and between the MR element 4 and the upper shield layer 5, respectively, and an MR lead layer that is electrically connected to the MR element 4 is further placed.

The recording head 1B is for perpendicular magnetic recording, and has a main magnetic pole layer 6, a trailing shield 81, a leading shield 84, the spin torque oscillator 10 positioned at a gap (write gap) between the main magnetic pole 6 and the trailing shield 81, a first coil 9a and a second coil 9b.

The main magnetic pole layer 6 configures a magnetic guide path for guiding a magnetic flux, which has been generated by applying a writing current to the first coil 9a and the second coil 9b while focusing to a magnetic recording layer (perpendicular magnetization layer) to be written on.

The main magnetic pole 6 extends from the ABS 70 rearward in the height direction and includes a main magnetic pole part 61 and an auxiliary magnetic pole part 62. The main magnetic pole part 61 and the auxiliary magnetic pole part 62 can be arranged upside down (Z direction) depending upon the design specifications, as well.

Figure 5:
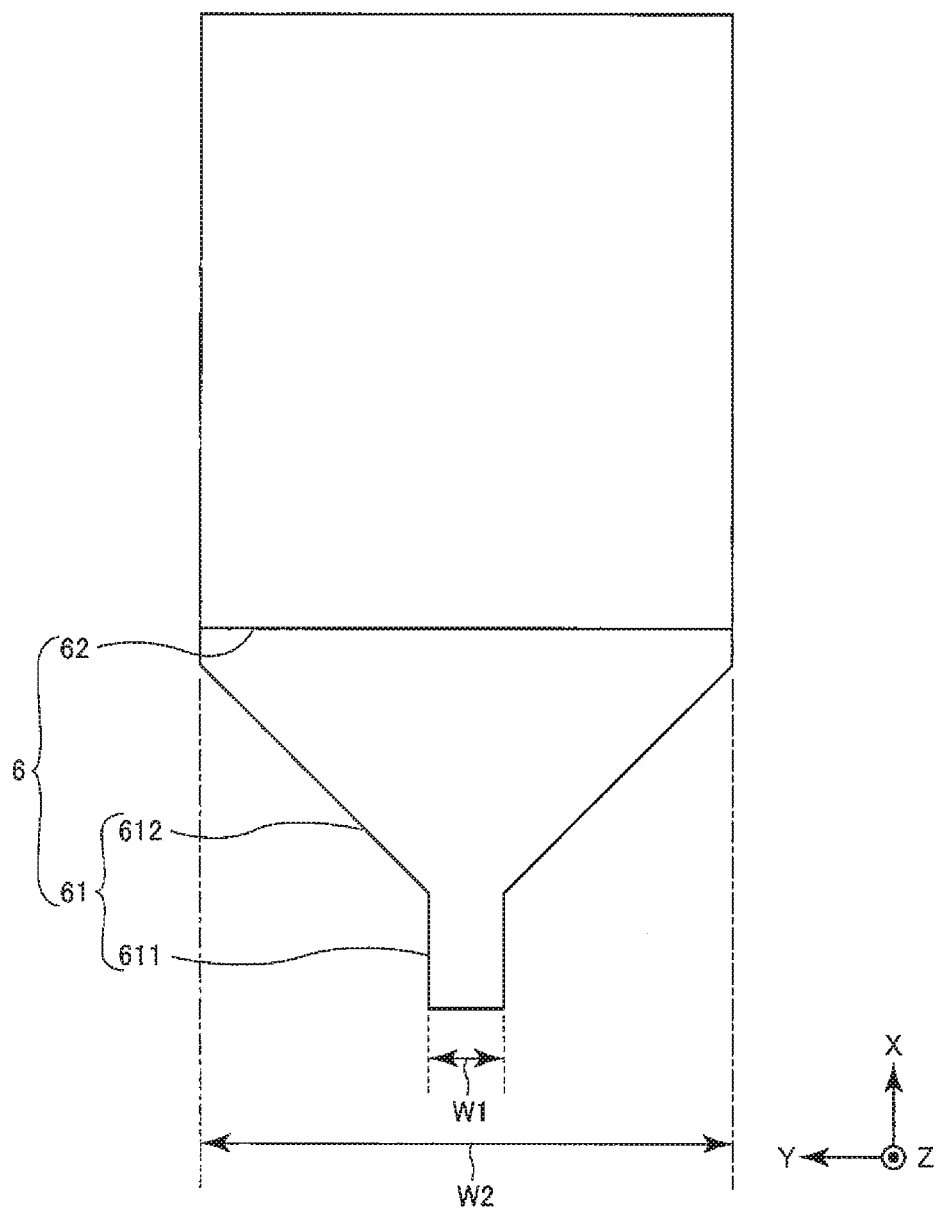
FIG. 5 is a plan view schematically showing a main magnetic pole layer in a recording head of the magnetic recording head relating to one embodiment of the present invention.

The auxiliary magnetic pole part 62 extends in the height direction from a position receded from the ABS 70. This auxiliary magnetic pole part 62 is arranged, for example, at the trailing side relative to the main magnetic pole part 61, and has a rectangular planar shape (width: W2) as shown in FIG. 5. The auxiliary magnetic pole part 62, as described above, may be arranged at the leading side of the main magnetic pole part 61.

The main magnetic pole part 61 extends from the ABS 70 rearward in the height direction. This magnetic main pole 61, for example, as shown in FIG. 5, includes a first narrower magnetic pole part 611, which extends from the ABS 70 rearward in the height direction, and a second wider magnetic pole part 612, which continues to the back side of the first magnetic pole part 611.

The first magnetic pole 611 is a substantial magnetic flux discharging portion, and has a certain width W1 that regulates recording track width. The second magnetic pole part 612 is a portion that supplies the magnetic flux to the first magnetic pole part 611 and has a width W2, which is greater than the width W1 of the first magnetic pole part 611. The width W2 of the second magnetic pole part 612 gradually becomes smaller as it approaches the first magnetic pole part 611 in front of the height direction. Because the first magnetic pole part 611 has the smaller width W1, it is possible to generate a minute writing magnetic field, and it becomes possible to set the track width at a minute value corresponding to the high recording density.

The main magnetic pole part 61, on the ABS 70, has a so-called inverted trapezoid-shaped end surface 61a where, for example, the upper side (+Z side) is wider than the lower side (−Z side) and its width becomes narrower as it extends downward (−Z direction) (see FIGS. 7A to 7D).

The main magnetic pole layer 6 (the main magnetic pole part 61 and the auxiliary magnetic pole part 62) is configured with a soft magnetic material having high saturation magnetic flux density, and, for example, can be configured with a soft magnetic material, which is an iron-based alloy material (such as FeNi, FeCo, FeCoNi, FeN or FeZrN) consisting primarily of Fe. The main magnetic pole part 61 and the auxiliary magnetic pole part 62 may be separated and configured with soft magnetic materials, which are different from each other. For example, the main magnetic pole part 61 can be configured with a soft magnetic material having saturation magnetic flux density that is higher than that of the auxiliary magnetic pole part 62.

Figure 6:
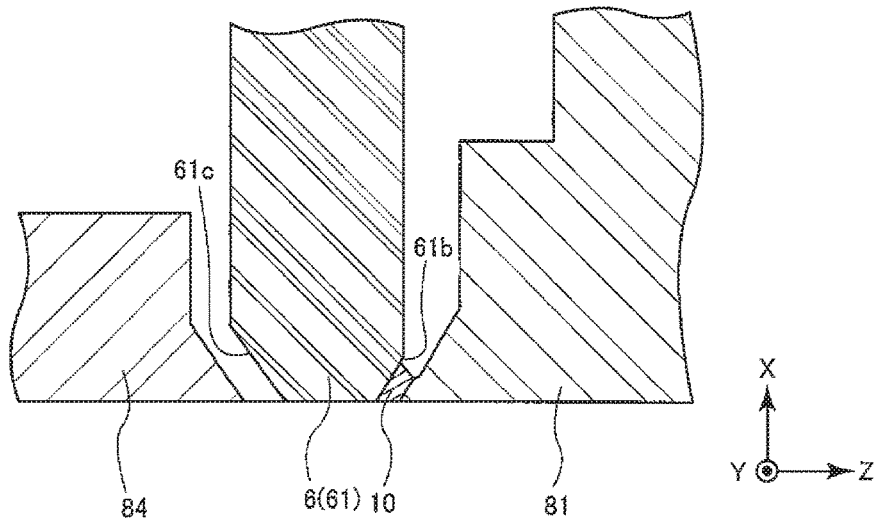
FIG. 6 is a partially-enlarged cross-sectional view showing a schematic configuration of the recording head in the magnetic recording head relating to one embodiment of the present invention.

As shown in FIG. 6, a trailing-side (+Z side) end surface 61b and a leading side (−Z side) end surface 61c of the main magnetic pole part 61 positioned in the vicinity of the ABS 70 are configured to be tapered so that the thickness of the main magnetic pole part 61 (Z-direction thickness) approaching the ABS 70 is gradually reduced. This enables further focusing of the recording magnetic flux, which is generated from the main magnetic pole part 61, at the ABS 70.

As shown in FIGS. 7A to 7D, the main magnetic pole part 61 is surrounded by the trailing shield 81, the two side shields 82 and 83 that continue to the trailing shield 81 at both outer sides in the cross track direction, and the leading shield 84, which continues to the two side shields 82 and 83, respectively, when viewed from the ABS 79 side. The trailing shield 81 is arranged at the trailing side of the main magnetic pole part 61 to interpose the write gap WG across the main magnetic pole part 61. The trailing shield 81, the side shields 82 and 83 and the leading shield 84 have a function to take in a recording magnetic flux that is generated from the main magnetic pole part 61 and expands. The trailing shield 81 has reached the ABS 70, and fulfills a role as a magnetic guide path of the magnetic flux, which is returned from the soft magnetic under layer placed under the recording layer (perpendicular magnetization layer) of the magnetic disk 100. The trailing shield 81, the side shields 82 and 83 and the leading shield 84 can be configured with, for example, NiFe (permalloy) having high saturation magnetic flux density or the similar iron-based alloy material to the main magnetic pole layer 6 or the like.

The write gap WG is a gap having shape that linearly extends substantially along the cross track direction between the main magnetic pole part 61 and the trailing shield 81, and the write gap WG is positioned along the trailing-side (+Z side) end surface 61b of the main magnetic pole part 61 and the trailing-side (+Z side) end surfaces 82b and 83b of the side shields 82 and 83 and the end surface 61b and the leading-side (−Z side) end surface 81c of the trailing shield 81. The write gap WG includes a first write gap portion WG1 positioned between the trailing-side (+Z side) end surface 61b of the main magnetic pole part 61 and the trailing shield 81 and roughly in the center in the cross track direction, and a second write gap portion WG2 and a third write gap portion WG3, which continue to both cross track-direction ends of the first write gap WG1 and which extend outward in the cross track direction. The second write gap portion WG2 and the third write gap portion WG3 are positioned between the end surface 81c of the trailing shield 81, and the end surfaces 82b and 83b of the side shields 82 and 83 (in the down track direction). Because the write gap WG includes the second write gap portion WG2 and the third write gap portion WG3, which continue to both cross track direction ends of the first write gap portion WG1 and extend outward along the cross track direction, the magnetic field intensity Hy and a recording magnetic field gradient HGy in the down track direction can be improved. As a result, since the magnetic field intensity to be applied to the spin torque oscillator 10 placed in the first write gap portion WG1 can be increased, an oscillation frequency in the spin torque oscillator 10 can be improved and an assist effect by a microwave magnetic field can be improved. Further, bit density (BPI) can be improved because the recording magnetic field gradient (HGy) can be improved.

Figure 7A:
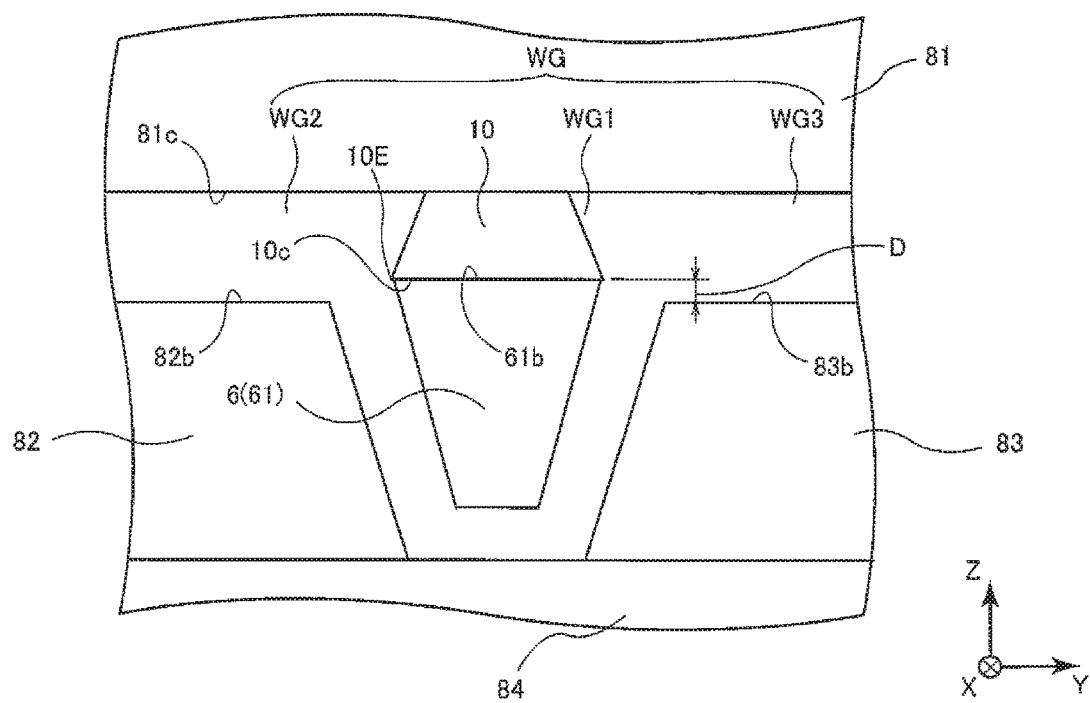
FIG. 7A is a plan view showing a schematic configuration in the first aspect of a recording head of the magnetic recording head relating to one embodiment of the present invention viewed from the ABS side.

When viewed from the ABS 70 side, at least a portion of the trailing-side (+Z side) end surfaces 82b and 83b of the two side shields 82 and 83 is positioned closer to the leading side (−Z side) than the leading-side (−Z side) end surface 10c of the spin torque oscillator 10 (trailing-side (+Z side) end surface 61b of the main magnetic pole part 61). Specifically, when viewed from the ABS 70 side, within a range of a predetermined length $L_{CT}$ along the cross track direction from a cross track-direction end part 10E of the spin torque oscillator 10, the trailing-side (+Z side) end surfaces 82b and 83b of the side shields 82 and 83 should be positioned closer to the leading side (−Z side) than the leading-side (−Z side) end surface 10c (the trailing-side (+Z side) end surface 61b of the main magnetic pole part 61). For example, as shown in FIG. 7A, the entire end surfaces 82b and 83b of the side shields 82 and 83 may be positioned closer to the leading side than the end surface 10c of the spin torque oscillator 10 (the end surface 61b of the main magnetic pole part 61). Further, when the end surfaces 82b and 83b of the side shields 82 and 83 include first end surfaces 821b and 831b, and second end surfaces 822b and 832b that are positioned more outward in the cross track direction than the first end surfaces 821b and 831b, the first end surfaces 821b and 831b are positioned closer to the leading side than the end surface 10c of the spin torque oscillator 10 (the end surface 61b of the main magnetic pole part 61), but the second end surfaces 822b and 832b may be substantially at the same position as the end surface 10c of the spin torque oscillator 10 (the end surface 61b of the main magnetic pole part 61) in the down track direction (see FIG. 7B) and may be closer to the trailing side than the end surface 10c of the spin torque oscillator 10 (the end surface 61b of the main magnetic pole part 61) (see FIG. 7C). Thus, when viewed from the ABS 70 side, within the range of a predetermined length along the cross track direction from a cross track-direction end part 10E of the spin torque oscillator 10, because the end surfaces 82b and 83b of the side shields 82 and 83 (the first end surfaces 821b and 831b) are positioned closer to the leading side (−Z side) than the end surface 10c of the spin torque oscillator 10 (the end surface 61b of the main magnetic pole part 61), magnetic coupling between the spin torque oscillator 10 and the side shields 82 and 83 can be weakened, and the oscillator of the spin torque oscillator 10 can be improved. Further, since a fluctuation or the like of magnetization of the side shields 82 and 83 can be suppressed, writing into adjacent tracks or the like (ATE: Adjacent Track Erasure, WATE: Wide Area Track Erasure) can be suppressed.

Figure 7B:
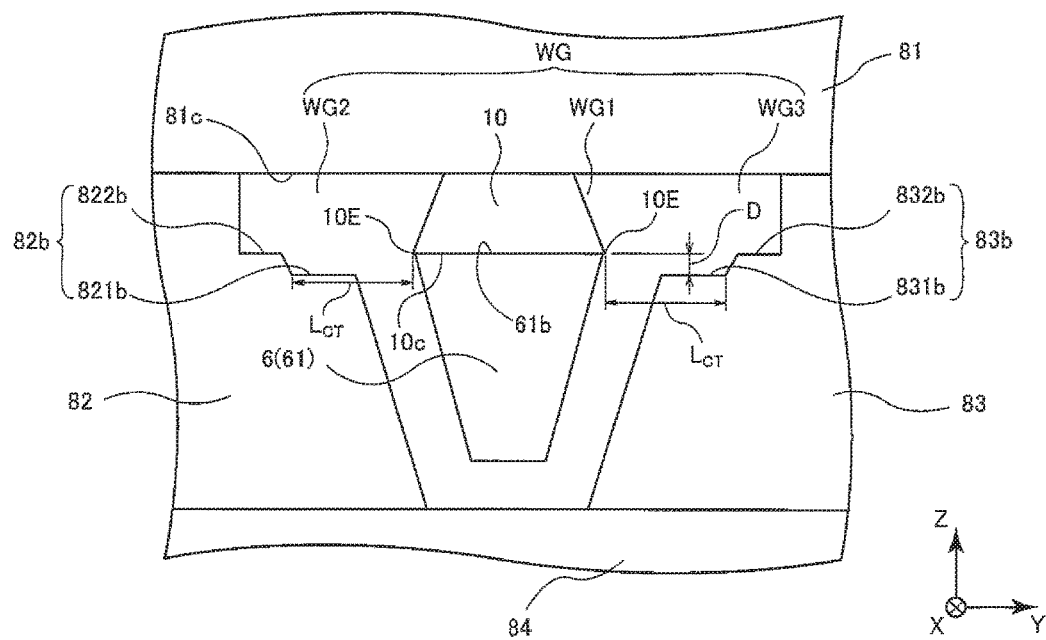
FIG. 7B is a plan view showing a schematic configuration in the second aspect of a recording head of the magnetic recording head relating to one embodiment of the present invention viewed from the ABS side.
Figure 7C:
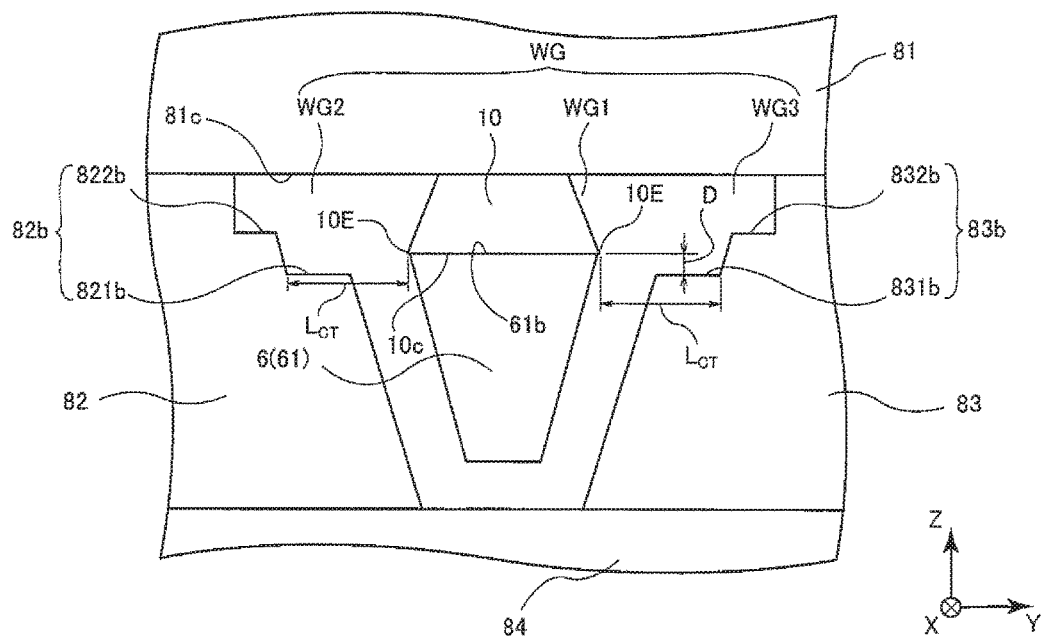
FIG. 7C is a plan view showing a schematic configuration in the second aspect of a recording head of the magnetic recording head relating to one embodiment of the present invention viewed from the ABS side.
Figure 7D:
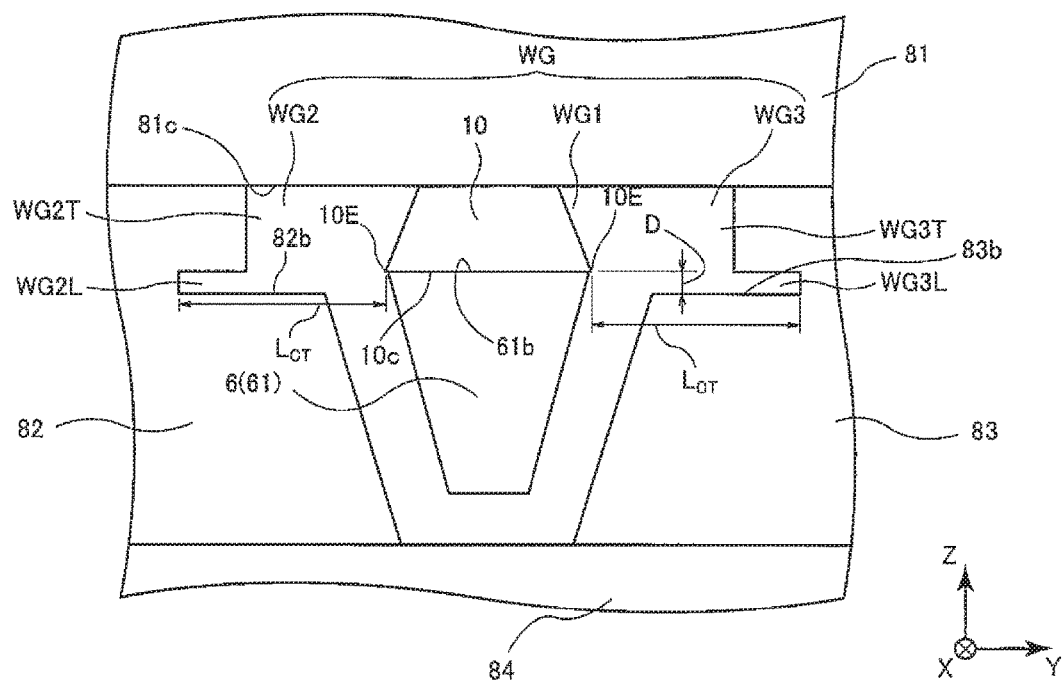
FIG. 7D is a plan view showing a schematic configuration in the second aspect of a recording head of the magnetic recording head relating to one embodiment of the present invention viewed from the ABS side.

Furthermore, in the magnetic recording head 1 relating to the present embodiment, when viewed from the ABS 70 side, among the second write gap portion WG2 and the third write gap portion WG3, portions WG2L and WG3L positioned closer to the leading side (−Z side) than the end surface 10c of the spin torque oscillator 10 (the end surface 61b of the main magnetic pole 61) can be extended more outward in the cross track direction than portions WG2T and WG3T positioned at the trailing side (+Z side) (see FIG. 7D). When lengths of the second write gap portion WG2 and the third write gap portion WG3 in the down track direction (gaps between the trailing shield 81 and the side shields 82 and 83) become relatively longer, they tend to show deterioration of writing characteristics in the magnetic recording head 1, but because the leading-side portions WG2L and WG3L of the second write gap portion WG2 and the third write gap portion WG3 are extended more outward in the cross track direction than the trailing-side portions WG2T and WG3T, deterioration of the writing characteristics in the magnetic recording head 1 can be suppressed.

In the present embodiment, a predetermined length $L_{CT}$ in the cross track direction from the cross track-direction end portion 10E of the spin torque oscillator 10 can be set preferably at 15 nm or greater, and more preferably at 15 nm to 100 nm. If the predetermined length is less than 15 nm, an effect to weaken the magnetic coupling between the spin torque oscillator 10 and the side shields 82 and 83 is not likely to be sufficiently obtained.

When viewed from the ABS 70 side, the end surfaces 82b and 83b of the side shields 82 and 83 (the first end surfaces 821b and 831b) are preferably away from the end surface 10c of the spin torque oscillator 10 (the end surface 61b of the main magnetic pole part 61) along the down track direction at 3 nm or greater toward the leading side (−Z side), and more preferably at approximately 3 nm to 30 nm toward the leading side (−Z side). If a gap D between the end surfaces 82b and 83b of the side shields 82 and 83 (the first end surfaces 821b and 83 b) and the end surface 10c of the spin torque oscillator 10 (the end surface 61b of the main magnetic pole part 61) along the down track direction is less than 3 nm, an effect to weaken the magnetic coupling between the spin torque oscillator 10 and the side shields 82 and 83 is not likely to be sufficiently obtained.

Figure 8:
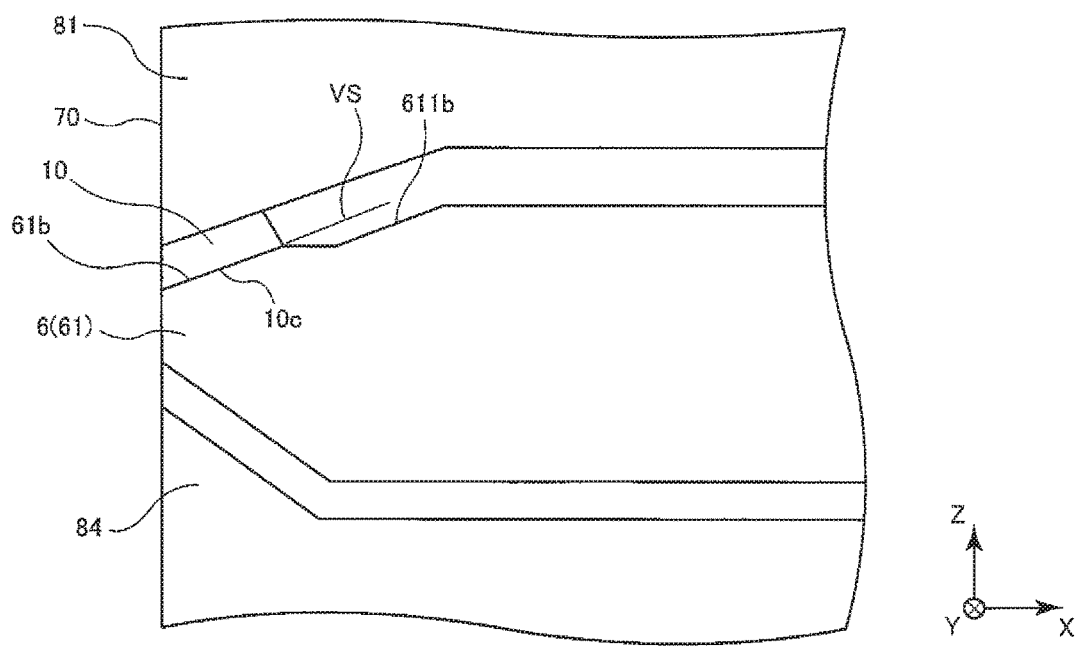
FIG. 8 is a partially-enlarged cross-sectional view showing a schematic configuration of a main magnetic pole part, a spin torque oscillator and a trailing shield of the magnetic recording head relating to one embodiment of the present invention.

As shown in FIG. 8, when a cut plane surface of the magnetic recording head 1 relating to the present embodiment (a cut plane surface that is orthogonal to the ABS 70 and parallel to the down track direction) is viewed, the trailing-side (+Z side) end surface 611b that is positioned more rearward in the height direction than the end surface 61b of the main magnetic pole part 61 and that is almost parallel with the end surface 61b is preferably positioned closer to the leading side than an imaginary plane VS obtained by extending the end surface 10c of the spin torque oscillator 10 (the end surface 61b of the main magnetic pole part 61) rearward in the height direction. In other words, although the end surface 61b of the main magnetic pole part 61 contacts the end surface 10c of the spin torque oscillator 10, the end surface 611b of the main magnetic pole part 61 is preferably recessed more toward the leading side (−Z side) than the end surface 61b. Because the main magnetic pole part 61 has such shape, an oscillation efficiency of the spin torque oscillator 10 can be improved.

The spin torque oscillator 10 that generates a microwave magnetic field, which is superimposed on a recording magnetic field from the main magnetic pole layer 6 (main magnetic pole part 61) at the time of writing, is placed in the write gap WG (the first write gap portion WG1) between the main magnetic pole part 61 and the trailing shield 81. Furthermore, details of the configuration of the spin torque oscillator 10 will be described later.

At the rear side in the height direction from the ABS 70, between the main magnetic pole layer 6 and the trailing shield 81, a first back gap layer 81b made of an insulator that electrically insulates those is arranged, and between the main magnetic pole layer 6 and the leading shield 84, a second back gap layer 84b made of an insulator that electrically insulates those is arranged.

A first coil 9a and a second coil 9b generate a magnetic flux for magnetic recording into the magnetic disk 100, and for example, they are configured with a high conductivity material, such as copper (Cu). The first coil 9a and the second coil 9b have a winding structure (spiral structure) that is wound by centering upon linkage parts 81a and 84a, the first back gap layer 81b and the second back gap layer 84b, respectively. The first coil 9a and the second coil 9b are configured to have a two-turn loop shape that is continuous from one end to the other end, respectively, and they have a front turn part roughly above insulating layers IL1 and IL2, respectively. Furthermore, the magnetic recording head 1 relating to the present embodiment may be provided with a coil having a helical structure instead of the first coil 9a and the second coil 9b having a spiral structure.

A non-magnetic layer NML is placed in the part at the further back side of the height direction than the front turn part of the first coil 9a and the second coil 9b, via the insulating layer IL3. This non-magnetic layer NML is continuously placed on the trailing shield 81, as well, and reaches the ABS 70. The non-magnetic layer NML fulfills its function mainly as a protective layer.

Furthermore, in the present embodiment, the number of turns of the first coil 9a and the second coil 9b is two, respectively, but the number is not limited to this, but it can be appropriately set within the range 1 to 4 turns.

It is desirable that the first coil 9a and the second coil 9b have a plurality of turns, and an insulating layer IL4 of a dry film is embedded into a wound coil crevice. As the insulating layer IL4 of the dry film, it is preferable to be configured with a material, such as alumina, formed by a so-called chemical vapor deposition (CVD) method. In order to certainly fill and form the insulating layer IL4 of the dry film to the coil crevice, in particular, the coil shape is important, and it is particularly desirable for the coil not to have an inverted taper shape in the depth direction.

In the present embodiment, the main magnetic pole layer 6 (the main magnetic pole part 61) and the trailing shield 81 are connected to a drive current circuit (power circuit) 90 for applying a drive current $I_{OP}$ to the spin torque oscillator 10 via terminals 91 and 92, respectively. The drive current $I_{OP}$ that is supplied from the drive current circuit 90 flows into the main magnetic pole layer 6 (the main magnetic pole part 61), the spin torque oscillator 10 and the trailing shield 81, in respective order.

Because the drive current $I_{OP}$ flows, electrons are spin-polarized due to magnetization of a spin injection layer 14. When a spin polarization ratio of the spin injection layer 14 is positive, spin electrons that are polarized to an inverse direction from the majority spin of the spin injection layer 14 are reflected at the spin injection layer 14 and injected into a magnetic field generation layer 12. These reflected spin electrons act to override damping of the magnetization of the magnetic field generation layer 12 by an external magnetic field and induce the precession movement of the magnetization of the magnetic field generation layer 12, and a microwave magnetic field is generated from the magnetic field generation layer 12. A signal can be recorded to the magnetic disk 100 with great magneto crystalline anisotropic energy Ku by superimposing the microwave magnetic field onto the recording magnetic field from the main magnetic pole layer 6.

Furthermore, depending upon the layer configuration of the spin torque oscillator 10 and mechanism of development of a microwave magnetic field or the like, the drive current $I_{OP}$ may flow into the trailing shield 81, the spin torque oscillator 10 and the main magnetic pole layer 6 (main magnetic pole part 61), in respective order.

Figure 9:
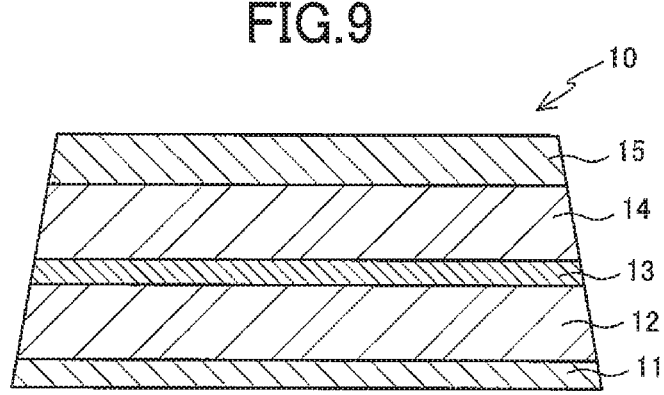
FIG. 9 is a cross-sectional view schematically showing the first aspect of a laminate structure of a spin torque oscillator in one embodiment of the present invention.

Details of the configuration of the spin torque oscillator 10 are explained hereafter, with reference to FIG. 9.

As shown in FIG. 9, the spin torque oscillator 10 is a laminated element where a buffer layer 11, the magnetic field generation layer 12, a non-magnetic spacer layer 13, the spin injection layer 14 and a cap layer 15 with approximately 0.5 nm to 20 nm of thickness made from Ru or the like are laminated from the main magnetic pole layer 6 (main magnetic layer part 61) side in respective order. In the spin torque oscillator 10, the magnetization of the magnetic field generation layer 12 precesses and a magnetic field (for example, a microwave magnetic field) can be generated from the magnetic field generation layer 12 by applying a direct current from the buffer layer 11 side toward the cap layer 15 side. Furthermore, in the present embodiment, the layer configuration of the spin torque oscillator 10 is not particularly limited as long as the magnetization of the magnetic field generation layer 12 can be fluctuated in response to the spin transfer torque during precession movement. The spin torque oscillator 10 should have at least the magnetic field generation layer 12 and the non-magnetic layer (non-magnetic spacer layer 13), and may not have, for example, the buffer layer 11, the spin injection layer 14 or the cap layer 15. When the spin torque oscillator 10 does not have the spin injection layer 14, the main magnetic pole layer 6 (the main magnetic pole part 61) that contacts a non-magnetic layer (the non-magnetic spacer layer 13) or the trailing shield 81 can fulfill a function as the spin injection layer 14.

The buffer layer 11 is a metallic simple layer made of one type to be selected from a group constituting of tantalum (Ta), aluminum (Al), titanium (Ti), vanadium (V), chrome (Cr), manganese (Mn), iron (Fe), cobalt (Co), nickel (Ni), copper (Cu), zinc (Zn), zirconium (Zr), niobium (Nb), molybdenum (Mo), ruthenium (Ru), rhodium (Rh), palladium (Pd), silver (Ag), hafnium (Hf), tungsten (W), iridium (Ir), platinum (Pt) and gold (Au), or an alloy layer containing at least one type to be selected from the group above. Film thickness of the buffer layer 11 is preferably 0.4 nm to 5 nm, and is more preferably 0.8 nm to 3 nm.

The magnetic field generation layer 12 is a ferromagnetic layer that is configured with a material where a direction of the magnetization in an initial state (a state where no current flows and no magnetic field is applied, as well) is almost in parallel with a film surface. The greater the saturation magnetization Ms (emu/cm$^3$) of the magnetic field generation layer 12 becomes and the thicker the film thickness becomes, the more the intensity of the microwave magnetic field to be generated is increased, thus, the magnetic field generation layer 12 is preferably configured with a material with greater saturation magnetization Ms, and the film thickness is preferably thick within a predetermined range that is fit in the first write gap portion (see FIGS. 7A to 7D). As a constituent material of the magnetic field generation layer 12, for example, soft magnetic materials, such as [FeCo/Ni]$_m$, FeCo, FeCoAl, FeCoSi, FeCoB or FeNi, and CoIr, [Fe/Co]$_m$ or the like having negative perpendicular magnetic anisotropy are exemplified. Furthermore, "m" is a number of repetitive laminates shown within a bracket. When [FeCo/Ni]$_m$ is used as the constituent material of the magnetic field generation layer 12, it is preferable that the film thickness of FeCo is thicker than that of Ni, and the film thickness of FeCo is preferably 0.4 nm to 4 nm and more preferably 0.8 nm to 2 nm, and the film thickness of Ni is preferably 0.1 nm to 1 nm and more preferably 0.1 nm to 0.5 nm. The number of repetitive laminates m in the laminate structure is preferably 1 to 20, and more preferably 3 to 10. The film thickness of the magnetic field generation layer 12 is approximately 2 nm to 20 nm, and is more preferably approximately 5 nm to 15 nm.

The non-magnetic spacer layer 13 may be configured with non-magnetic metal with a high spin permeability, such as copper (Cu), silver (Ag), gold (Au), chrome (Cr) or aluminum (Al), and may be a tunnel barrier layer, such as MgO layer or Al$_2$O$_3$ layer. The film thickness of the non-magnetic spacer layer 13 is set, for example, at approximately 0.5 nm to 5 nm, and can be preferably set at approximately 1.5 nm to 3 nm. Since the film thickness of the non-magnetic spacer layer 13 is within the range above, an exchange-couple state of the magnetic field generation layer 12 and the spin injection layer 14 can be most suitably adjusted.

Figure 10:
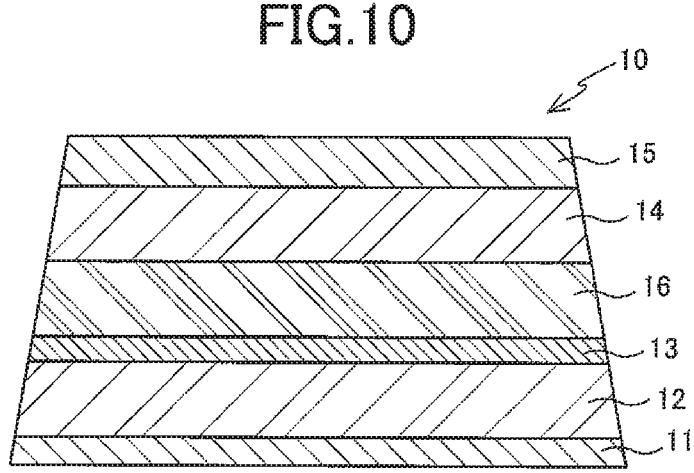
FIG. 10 is a cross-sectional view schematically showing the second aspect of a laminate structure of the spin torque oscillator in one embodiment of the present invention.

The spin injection layer 14 is a ferromagnetic layer having magnetic anisotropy in a perpendicular direction relative to the film surface (perpendicular magnetic anisotropy), and is configured with a multilayer film with magnetic bodies, such as [CoFe/Ni]$_n$, [Co/Pt]$_n$ or [Co/Pd]$_n$, or a multilayer film with a non-magnetic body. Furthermore, "n" is the number of repetitive laminates in the laminate structure showing within a bracket. Further, as the material that configures the spin injection layer 14, an alloy having perpendicular magnetic anisotropy, such as CoPt, FePt or MnGa, can also be used. When the spin injection layer 14 is configured with [CoFe/Ni]$_n$, it is preferable that film thickness of Ni is the same as that of CoFe or thicker than that. The film thickness of CoFe is preferably 0.1 nm to 1 nm, and more preferably 0.1 nm to 0.4 nm. The film thickness of Ni is preferably 0.2 nm to 1.5 nm, and more preferably 0.2 nm to 0.6 nm. The number of repetitive laminates n in the laminate structure is preferably 2 to 40, and more preferably 2 to 20. The spin injection layer 14 is a layer that spin-polarizes electrons by applying a current in the laminate direction of the spin torque oscillator 10, and that fulfills a role to inject the electrons into the magnetic field generation layer 12. The film thickness of the spin injection layer 14 is preferably 0.6 nm to 15 nm, and more preferably 1 nm to 10 nm. In order to increase the spin polarization ratio by the spin injection layer 14, a magnetic body layer with a high spin polarization ratio may exist between the spin injection layer 14 and the non-magnetic spacer layer 13. In particular, when the spin injection layer 14 is configured with $[CoFe/Ni]_n$, since Ni with a small spin polarization ratio is contained, as shown in FIG. 10, a magnetic body layer 16 may intervene between the non-magnetic spacer layer 13 and the spin injection layer 14. Since the magnetization of the magnetic body layer 16 is easily reversed if the perpendicular magnetic anisotropy of the magnetic body layer 16 is smaller than that of the spin injection layer 14, the magnetization reversal of the spin injection layer 14 can be induced due to this. As the material that configures such magnetic body layer 16, a soft magnetic alloy, such as CoFe or CoFeB; Co based Heusler alloy, such as $Co_2MnSi$ or $Co_2FeSi$; materials having a negative spin polarization, such as FeCr or FeV, and the like can be exemplified. The film thickness of the magnetic body layer 16 is preferably 0.1 nm to 8 nm, and more preferably 0.4 nm to 4 nm.

Figure 11:
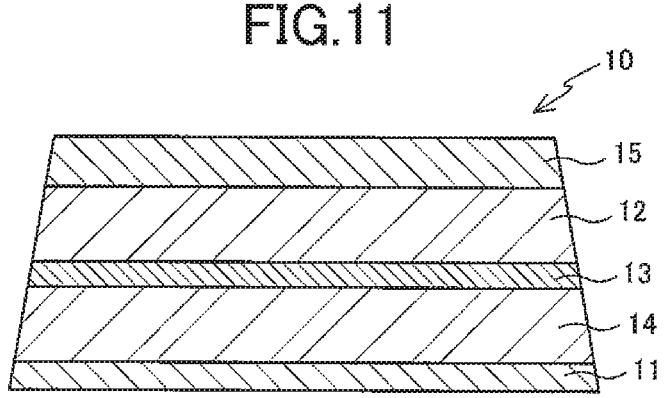
FIG. 11 is a cross-sectional view schematically showing the third aspect of a laminate structure of the spin torque oscillator in one embodiment of the present invention.

The spin torque oscillator 10, as shown in FIG. 11, may be a laminated element where the buffer layer 11, the spin injection layer 14, the non-magnetic spacer layer 13, the magnetic field generation layer 12 and the cap layer 15 are laminated from the main magnetic pole layer 6 (main magnetic pole part 61) side in respective order.

In the magnetic recording head 1 above, when viewed from the ABS 70 side, within the range of the predetermined length along the cross track direction from the cross track-direction end portion 10E of the spin torque oscillator 10, the end surfaces 82b and 83b of the side shields 82 and 83 (the first end surfaces 821b and 831b) are positioned closer to the leading side (−Z side) than the end surface 10c of the spin torque oscillator 10 (end surfaces 61b of the main magnetic pole part 61). Due to this, the magnetic coupling of the spin torque oscillator 10 with the side shields 82 and 83 can be weakened, and the oscillation of the spin torque oscillator 10 can be improved. Further, since the fluctuation of the magnetization of the side shields 82 and 83 or the like can be suppressed, writing into an adjacent track or the like (ATE or WATE) can be suppressed.

Further, because the write gap WG has the first write gap portion WG1 positioned between the main magnetic pole layer 6 (the main magnetic pole part 61) and the trailing shield 81 and the second write gap portion WG2 and the third write gap portion WG3 continuing to both ends thereof in the cross track direction, respectively, the magnetic field intensity Hy and the recording magnetic field gradient HGy in the down track direction can be improved. As a result, the oscillation frequency of the spin torque oscillator 10 can be improved, and a microwave magnetic field where a sufficient assist effect can be obtained can be generated, and, bit density (BPI) can be improved.

Therefore, according to the magnetic recording head 1 relating to the present embodiment, a signal can be recorded into a magnetic recording medium with great coercive force with high recording density.

The embodiment explained above is described to facilitate the understanding of the present invention, and is not described to limit the present invention. Therefore, each element disclosed in the embodiment is a concept including all design changes and equivalents in the technical scope of the present invention.

In the magnetic recording head above, the trailing-side (+Z side) end surfaces 82b and 83b of the side shields 82 and 83 are positioned closer to the leading side (−Z side) than the leading-side (−Z side) end surface 10c of the spin torque oscillator 10 (see FIGS. 7A to 7D), but this concept is not limited to this mode. For example, as shown in FIG. 8, if the end surface 611b of the main magnetic pole part 61 is recessed closer to the leading side (−Z side) than the imaginary plane (VS) obtained by extending the end surface 61b rearward in the height direction, the end surfaces 82b and 83b of the side shields 82 and 83 do not have to be positioned closer to the leading side (−Z side) than the end surface 10c of the spin torque oscillator 10, and positions of the end surfaces 82b and 83b of the side shields 82 and 83 and the end surface 10c of the spin torque oscillator 10 in the down track direction may be substantially the same.

EXAMPLES

The present invention will be explained in more detail hereafter, with reference to experimental examples and the like, but the present invention is not limited to such experimental examples and the like.

Example 1

An amplitude ΔM (T) of the magnification of the side shields 82 and 83 at the time of oscillation of the spindle torque oscillator 10 was obtained by simulation using an analysis model of the magnetic recording head 1 having the configuration shown in FIG. 4 and FIG. 7A (E1). This simulation analysis experiment was conducted using a three-dimensional Finite-Difference Time-Domain method (FDTD method), which is the electromagnetic field analysis.

As the magnetic recording head 1, a model where the main magnetic pole layer 6 (the main magnetic pole part 61) was formed with CoFe, and the trailing shield 81, the side shields 82 and 83 and the leading shield 84 were formed with NiFe was adopted.

Figure 12:
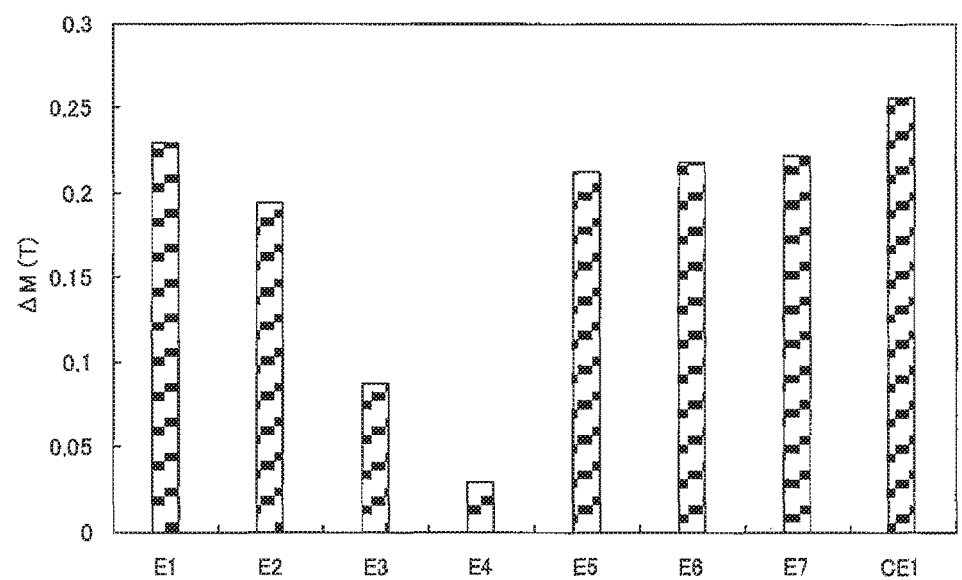
FIG. 12 is a graph showing simulation results of Examples 1 to 7 and Comparative Example 1.

In the model above, a gap D between the end surfaces 82b and 83b of the side shields 82 and 83 and the end surface 10c of the spin torque oscillator 10 (the end surface 61b of the main magnetic pole part 61) along the down track direction was set at 5 nm. Simulation results are shown in FIG. 12.

Example 2

In the model above, the amplitude ΔM of the magnification of the side shields 82 and 83 was obtained by simulation in the same manner as in Example 1, except for setting the gap D between the end surfaces 82b and 83b of the side shields 82 and 83 and the end surface 10c of the spin torque oscillator 10 (the end surface 61b of the main magnetic pole part 61) along the down track direction at 10 nm (E2). Simulation results are shown in FIG. 12.

Example 3

In the model above, the amplitude ΔM of the magnification of the side shields 82 and 83 was obtained by simulation in the same manner as in Example 1, except for setting the gap D between the end surfaces 82b and 83b of the side shields 82 and 83 and the end surface 10c of the spin torque oscillator 10 (the end surface 61b of the main magnetic pole part 61) along the down track direction at 20 nm (E3). Simulation results are shown in FIG. 12.

Example 4

In the model above, the amplitude ΔM of the magnification of the side shields 82 and 83 was obtained by simulation in the same manner as in Example 1, except for setting the gap D between the end surfaces 82b and 83b of the side shields 82 and 83 and the end surface 10c of the spin torque oscillator 10 (the end surface 61b of the main magnetic pole part 61) along the down track direction at 25 nm (E4). Simulation results are shown in FIG. 12.

Example 5

The amplitude ΔM of the magnification of the side shields 82 and 83 was obtained by simulation in the same manner as in Example 2, except for using the analysis model of the magnetic recording head 1 having the configuration shown in FIG. 7B (E5). Simulation results are shown in FIG. 12.

Example 6

The amplitude ΔM of the magnification of the side shields 82 and 83 was obtained by simulation in the same manner as in Example 2, except for using the analysis model of the magnetic recording head 1 having the configuration shown in FIG. 7C (E6). Simulation results are shown in FIG. 12.

Example 7

The amplitude ΔM of the magnification of the side shields 82 and 83 was obtained by simulation in the same manner as in Example 2, except for using the analysis model of the magnetic recording head 1 having the configuration shown in FIG. 7D (E7). Simulation results are shown in FIG. 12.

Comparative Example 1

The amplitude ΔM of the magnification of the side shields 82 and 83 at the time of oscillation of the spin torque oscillator 10 using the analysis model of the magnetic recording head having a similar configuration to that in Example 1, except for setting the gap D between the end surfaces 82b and 83b of the side shields 82 and 83 and the end surface 10c of the spin torque oscillator 10 (the end surface 61b of the main magnetic pole part 61) along the down track direction at 0 nm (CE1). Simulation results are shown in FIG. 12.

As shown in FIG. 12, it was confirmed that the amplitude of the magnetization of the side shields 82 and 83 would be able to be minimized, i.e., the fluctuation of the magnetization of the side shields 82 and 83 would be able to be suppressed, by positioning the end surfaces 82b and 83b of the side shields 82 and 83 closer to the leading side (−Z side) than the end surface 10c of the spin torque oscillator 10. As in Examples 1 to 7, because the fluctuation of the magnetization of the side shields 82 and 82 can be suppressed, it is considered that a suppressing effect of the writing into an adjacent track (ATE or WATE) or the like can be exerted.

Example 8

The amplitude of the magnetization M (X component: Mx, Y component: My, Z component: Mz) of the spin torque oscillator 10 (the magnetic field generation layer 12) at the time of oscillation of the spin torque oscillator 10 was obtained by simulation, using the analysis model of the magnetic recording head 1 having the configuration shown in FIG. 4 and FIG. 8.

As the magnetic recording head 1, a model where the main magnetic pole layer 6 (the main magnetic pole part 61) was formed with CoFe, and the trailing shield 81, the side shields 82 and 83 and the leading shield 84 were formed with NiFe was adopted.

In the model above, a length between the trailing-side (+Z side) end surface 611b positioned at the further back side in the height direction than the end surface 61b of the main magnetic part 61 and the imaginary plane VS obtained by extending the end surface 10c of the spin torque oscillator 10 (the end surface 61b of the main magnetic pole part 61) backward in the height direction (the distance in the direction that is orthogonal to the end surface 611b and the imaginary plane VS was set at 10 nm). Simulation results are shown in FIG. 13.

Comparative Example 2

The amplitude of the magnetization M (X component: Mx, Y component: My, Z component: Mz) of the spin torque oscillator 10 (the magnetic field generation layer 12) at the time of oscillation of the spin torque oscillator 10 was obtained by simulation, using the analysis model of the magnetic recording head having a configuration similar to that of Example 2, except for setting the length between the end surface 611b of the main magnetic pole part 61 and the imaginary plane VS at 0 nm. Simulation results are shown in FIG. 14.

Figure 13:
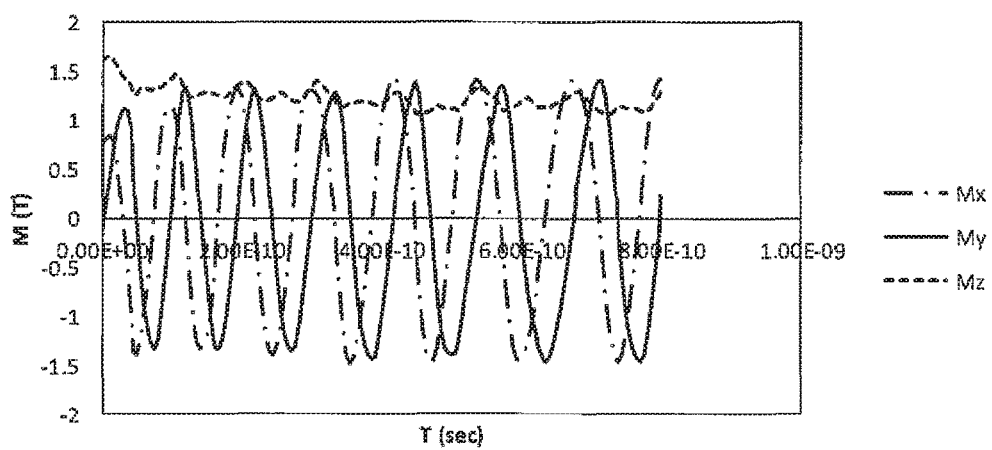
FIG. 13 is a graph showing a simulation result of Example 8.
Figure 14:
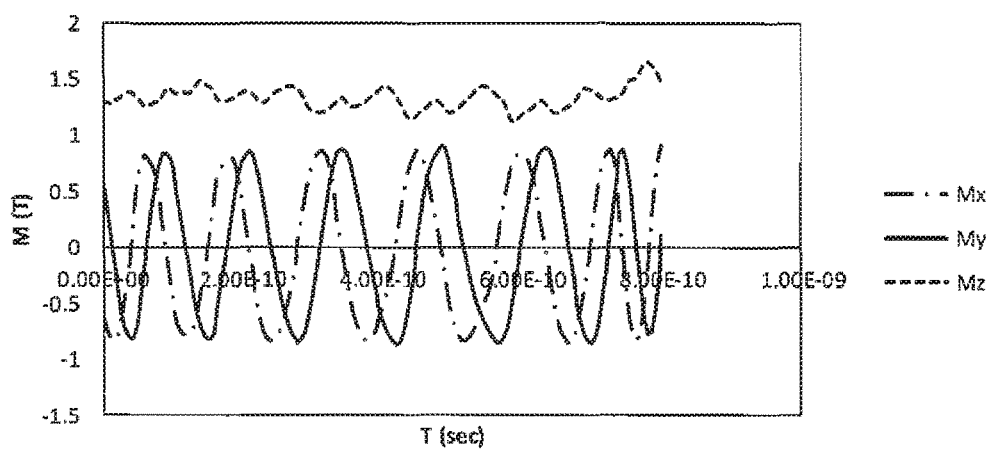
FIG. 14 is a graph showing a simulation result of Comparative Example 2.
Figure 15:
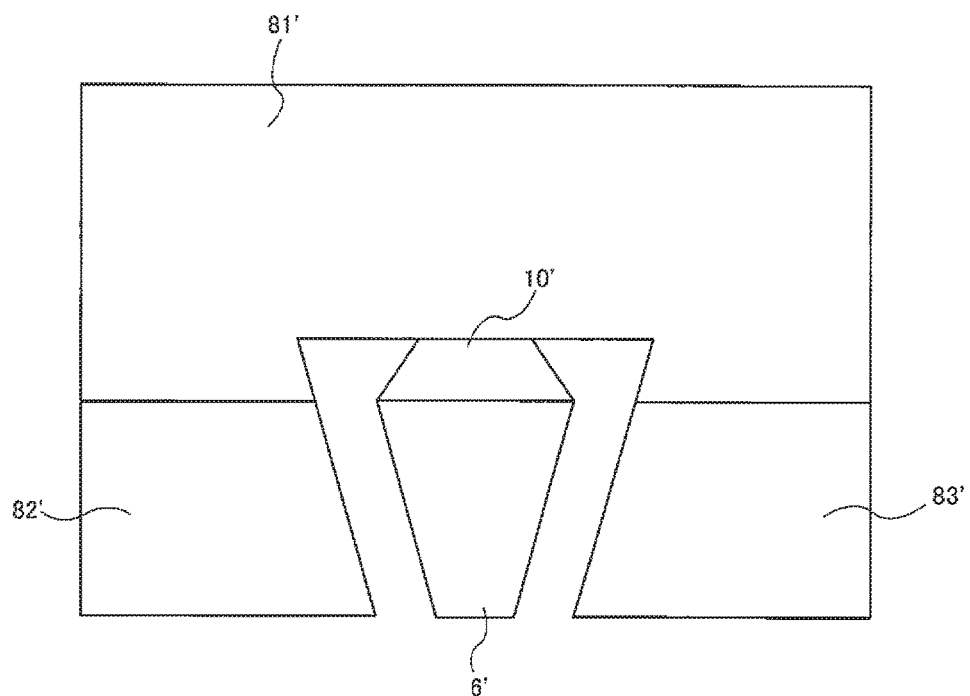
FIG. 15 is a plan view showing a schematic configuration of a recording head in a conventional magnetic head viewed from the ABS side.

In FIG. 13 and FIG. 14, a vertical axis indicates the magnetization M (T) of the spin torque oscillator 10, and a horizontal axis indicates a time T (sec). As shown in FIG. 13 and FIG. 14, it was confirmed that the amplitude of the magnetization M (X component: Mx, Y component: My, Z component: Mz) of the spin torque oscillator 10 (the magnetic field generation layer 12) in Example 8 would be greater than the magnetization M (X component: Mx, Y component: My, Z component: Mz) of the spin torque oscillator 10 in Comparative Example 2. Thus, it is believed that an oscillation efficiency of the spin torque oscillator 10 can be improved by recessing the end surface 611b of the main magnetic pole part 61 at the back side in the height direction further to the leading side (−Z side) than the end surface 61b.

The invention claimed is:
1. A magnetic recording head, comprising:
a main magnetic pole that generates a recording magnetic field to be applied to a magnetic recording medium from an end surface that forms a portion of an air bearing surface (hereafter, referred to as ABS) facing the magnetic recording medium,
a trailing shield that is placed by interposing a write gap at a trailing side of the main magnetic pole,
a spin torque oscillator that is placed within the write gap to be between the main magnetic pole and the trailing shield and that generates a microwave magnetic field to be superimposed on the magnetic recording medium with the recording magnetic field, and
two side shields that are placed at both sides of the main magnetic pole in a cross track direction, wherein
the two side shields include trailing-side end surfaces, respectively, each trailing-side end surface includes a first end surface, which is positioned inward of a second end surface, and the second end surface, which is positioned outward of the first end surface, so that the first end surfaces are closer to the spin torque oscillator than the second end surfaces, the first end surfaces and the second end surfaces are substantially parallel to the cross track direction, and when viewed from the ABS, the first end surfaces are offset toward a leading-side of the main magnetic pole from a leading-side end surface of the spin torque oscillator, and the second end surfaces are offset toward a trailing-side of the main magnetic pole from the leading-side end surface of the spin torque oscillator.

2. The magnetic recording head according to claim 1, wherein the first end surfaces are included within a range of a predetermined length along the cross track direction from the cross track-direction end part of the spin torque oscillator.

3. The magnetic recording head according to claim 2, wherein the range of the predetermined length is 15 nm to 100 nm.

4. The magnetic recording head according to claim 1, wherein on a cut plane surface where the magnetic recording head is cut along a direction that is orthogonal to the ABS and that is parallel to the down track direction, among the trailing-side end surfaces of the main magnetic pole, at least a portion at a further back side in the height direction from the ABS is offset toward the leading-side of the main magnetic pole from an imaginary plane obtained by extending the leading-side end surface of the spin torque oscillator rearward in the height direction.

5. A head gimbal assembly, comprising:
the magnetic recording head according to claim 1, and
a suspension that supports the magnetic recording head.

6. A magnetic recording apparatus, comprising:
a magnetic recording medium,
the magnetic recording head according to claim 1, and
a positioning device that supports the magnetic recording head, and that positions the magnetic recording head relative to the magnetic recording medium.

7. A magnetic recording head, comprising:
a main magnetic pole that generates a recording magnetic field to be applied to a magnetic recording medium from an end surface which forms a part of an air bearing surface (hereafter, referred to as ABS) facing the magnetic recording medium,
a trailing shield that is placed by interposing a write gap at a trailing side of the main magnetic pole,
a spin torque oscillator that is placed within the write gap to be between the main magnetic pole and the trailing shield and that generates a microwave magnetic field to be superimposed on the magnetic recording medium with the recording magnetic field, and
two side shields that are placed at both sides of the main magnetic pole in a cross track direction, wherein
a trailing-side end surface of the main magnetic pole includes a first end surface, which is in contact with a leading-side surface of the spin torque oscillator, and a second end surface, which is offset toward a leading-side of the main magnetic pole from an imaginary plane obtained by extending a leading-side end surface of the spin torque oscillator rearward in the height direction, and
the second end surface is substantially parallel to the imaginary plane.

8. A magnetic recording head, comprising:
a main magnetic pole that generates a recording magnetic field to be applied to a magnetic recording medium from an end surface that forms a portion of an air bearing surface (hereafter, referred to as ABS) facing the magnetic recording medium,
a trailing shield that is placed by interposing a write gap at a trailing side of the main magnetic pole,
a spin torque oscillator that is placed within the write gap to be between the main magnetic pole and the trailing shield and that generates a microwave magnetic field to be superimposed on the magnetic recording medium with the recording magnetic field, and
two side shields that are placed at both sides of the main magnetic pole in a cross track direction, wherein
the write gap includes a first write gap that is positioned substantially in the center in the cross track direction, and a second write gap and a third write gap that continue to both ends of the first write gap and that extend outward in the cross track direction,
the second write gap and the third write gap include a first portion, which is offset toward a leading-side of the side shields from the leading-side end surface of the spin torque oscillator, and a second portion, which is offset toward the trailing-side of the side shields from the leading-side end surface of the spin torque oscillator, respectively, and
the first portions extend more outward in the cross track direction than the second portions.

9. A magnetic recording head, comprising:
a main magnetic pole that generates a recording magnetic field to be applied to a magnetic recording medium from an end surface that forms a portion of an air bearing surface (hereafter, referred to as ABS) facing the magnetic recording medium,
a trailing shield that is placed by interposing a write gap at a trailing side of the main magnetic pole,
a spin torque oscillator that is placed within the write gap to be between the main magnetic pole and the trailing shield and that generates a microwave magnetic field to be superimposed on the magnetic recording medium with the recording magnetic field, and
two side shields that are placed at both sides of the main magnetic pole in a cross track direction, wherein
the two side shields include trailing-side end surfaces, respectively,
each trailing-side end surface includes a first end surface, which is positioned inward of a second end surface, and the second end surface, which is positioned outward of the first end surface, so that the first end surfaces are closer to the spin torque oscillator than the second end surfaces,
the first end surfaces and the second end surfaces are substantially parallel to the cross track direction, and
when viewed from the ABS, the first end surfaces are offset toward a leading-side of the main magnetic pole from a leading-side end surface of the spin torque oscillator, and the second end surfaces are substantially included in a plane that includes the leading-side end surface of the spin torque oscillator.

* * * * *